Jan. 30, 1968  D. C. PRICE  3,365,997
EXTRUDED AND THREADED PLATE METAL SLEEVE STRUCTURES
Filed Dec. 21, 1964   3 Sheets-Sheet 1

INVENTOR.
*Don C. Price*
BY
*Frease, Bishop, Johns & Schick*
ATTORNEYS

Jan. 30, 1968  D. C. PRICE  3,365,997
EXTRUDED AND THREADED PLATE METAL SLEEVE STRUCTURES
Filed Dec. 21, 1964  3 Sheets-Sheet 2

INVENTOR.
*Don C. Price*
BY
*Frease, Bishop, Johns & Schick*
ATTORNEYS

INVENTOR.
Don C. Price
BY
Frease, Bishop, Johns & Schick
ATTORNEYS

United States Patent Office｠

3,365,997
Patented Jan. 30, 1968

3,365,997
EXTRUDED AND THREADED PLATE METAL SLEEVE STRUCTURES
Don C. Price, Canton, Ohio, assignor to The Monarch Rubber Company, Hartville, Ohio, a corporation of Ohio
Filed Dec. 21, 1964, Ser. No. 419,634
10 Claims. (Cl. 85—32)

ABSTRACT OF THE DISCLOSURE

A plate steel structure having an integral tubular sleeve projecting from the top plate surface, precision-formed with concentric inner and outer surfaces each having a uniform diameter between a chamfered corner at the open end of the sleeve and the bottom plate surface; having a coined, frusto-conical-shaped corner between the internal sleeve opening and the top plate surface; the sleeve being formed by cold working the metal under confined pressure to provide crack-free, hardened and strengthened metal; and the coining of the corner imparting a permanent set to the sleeve metal stably to retain its precision-formed shape.

---

A threaded fastener with threads throughout the entire length of a precision-formed sleeve described in the preceding paragraph from the coined corner to the open end of the sleeve by roll-forming the threads without metal loss to provide threads having uncut surfaces which resist torque-tension loading without permanent deformation 30% in excess of the strength of a threaded sleeve formed of the same steel to the same dimensions with cut threads; and having a thread profile true as to size, undistorted as to shape and containing in excess of 75% of full thread profile.

A composite metal-rubber product including a metal component having either or both of the integral sleeve and threaded fastener structures described in the preceding paragraphs.

The new structures of the invention may be made by the methods set forth in my co-pending application, S.N. 411,753, filed Nov. 17, 1964, entitled, Manufacture of Plate Metal Parts With Integral Threaded Fasteners. The invention relates to sheet and plate metal products usually formed to desired shape by bending, stamping, or drawing operations and having one or more internally threaded tubular sleeves, necks, rings, or thimbles projecting integrally from one or more surfaces of such formed product to provide one or more threaded fasteners for such formed product; more particularly the invention relates to integral sleeves extruded from a plate metal wall having a new combination of characteristics as to sleeve wall thickness, structure and mechanical properties of the metal in the sleeve wall, and nature of the metal surfaces of the sleeve wall; similarly the invention relates to an internally threaded tubular sleeve structure projecting integrally from a plate metal wall having a new combination of physical, dimensional and surface characteristics and mechanical properties and providing an integral threaded fastener for such plate metal wall; and finally the invention relates to composite molded metal-rubber products having as a component metal part, a metal plate stamping having one or more of such extruded tubular sleeves or threaded tubular sleeves projecting integrally therefrom.

Composite molded metal-rubber products are used extensively in many fields, such for example, as motor mounts in automotive construction and as mounting pads in the assembly of electrical appliances such as refrigerators. Such composite metal-rubber products usually include at least two metal components or parts joined or bonded together by molded rubber maintaining the metal components spaced apart in desired relation. One or more of the metal parts individually may be desired to be connected to a structural or mounting member by a threaded connection between the part and a threaded bolt.

Usually such threaded connection includes a threaded fastener secured in some manner to the sheet metal component of the composite metal-rubber product. This is sometimes accomplished by welding a threaded nut to the sheet metal component. Sometimes the threaded connection is made by driving a self-tapping joint-forming screw or bolt into an opening formed in the sheet metal component.

Difficulties have been encountered in the manufacture or use of each of the welded-threaded-nut fasteners or the self-tapping screw fastened joints. Stamped metal components of automotive motor mounts frequently are formed of 11- to 3-gauge plate metal, for example, 8-gauge metal which is 0.1719″ thick. The threaded bolt connected to such a sheet metal member for example may have a 7/16″ thread with 14 threads per inch, and five to six threads in the tapped opening may be the minimum number of threads required for resisting yielding without a permanent set when the threaded connection is subjected to torque-tension loading which the connection is designed to carry.

Obviously, a self-tapping screw driven into an opening punched in such a metal component cannot satisfy such strength requirements for the described threaded connection fundamentally because the required number of five to six threads in the opening cannot be formed and the thread profile produced by driving a self-tapping screw into a hole in the plate metal part does not develop the strength against yielding under loading that is developed when a thread contour is formed accurately including the formation of a maximum portion of full thread profile.

Heretofore, these problems have been attempted to be resolved by welding a threaded nut, having the required thickness and the required size, shape and number of threads, to the sheet metal component of a composite metal-rubber product, with the threaded nut opening aligned with an opening punched in a wall of the sheet metal component.

However, satisfactory performance of a threaded fastener produced in this manner as a part of a sheet metal component of a composite metal-rubber product depends upon the character of the welded joint produced, the strength of the threads formed in the nut, the deviation of the threads from the desired thread size, the mechanical properties of the metal in the thread-formed zone, and the amount or degree of full thread profile developed, among other considerations.

The very nature of the welded-nut threaded fastener construction described and of the manner in which it is connected to the metal component of a composite metal-rubber product militates against obtaining favorable properties or characteristics individually or collectively in the indicated respects. Obviously, if the welded joint is weak, the strength of the threaded connection is weakened.

Where the threaded nut is welded to the composite product after the rubber has been molded, the welding damages adhesion between rubber and metal components in the welded area. On the other hand, when the nut is welded to the sheet metal component before rubber molding, the welded threaded nut or fastener may distort during the rubber molding step. Further, the rubber as well as adhesive material used in bonding the rubber and metal parts together may flow into the threaded areas of the nut during rubber molding and subsequently must be removed.

This involves a cleaning operation normally performed by a tap in order to remove foreign material from the nut threads. Such tap-cleaning operation may damage or enlarge the previously cut nut threads so that they are oversize and thus the efficiency of the threaded connection is impaired.

Moreover, the metal adjacent the thread surfaces of the nut is comparatively soft having been heated during the welding operation such that it must be considered to be material in the annealed state. Therefore, the thread metal will have minimum strength and normally will be the initial location of threaded connection failure by stripping the nut threads when the connection is subjected to extreme torque-tension loading.

Furthermore, the metal surfaces of the threads will have certain undesirable characteristics resulting from thread cutting operations, including score lines and burrs which unless removed may gall the threads of a bolt connected therewith. If the burrs are removed by a tap-cleaning operation also used to clean rubber and adhesive material resulting from the molding operation in the manufacture of composite metal-rubber products, the thread shape or contour may be cut, enlarged or damaged to such an extent as previously indicated as to impair the efficiency of the threaded connection.

Repeated but unsuccessful attempts to provide a solution for these problems have involved drawing a sleeve from a sheet or plate metal wall and then cutting threads in the drawn sleeve. Such drawn sleeves, particularly when drawn from heavy plate metal, have a tendency to develop cracks extending from the open end of the sleeve. Such cracks or cracking very materially limit the length of sleeve that can be drawn and which is satisfactory for the intended purpose. Further, the length of sleeve that may be drawn also is limited by the amount of material available in the drawn circle. Also, the wall thickness of such a drawn sleeve normally is too thin to permit threads with proper thread profile to be tapped by usual thread cutting operations in such sleeve.

Also, the inner and outer diameters of such drawn sleeves cannot be maintained within close enough tolerances, and concentricity between inner and outer sleeve diameters cannot be maintained, such as to allow a proper threaded contour to be formed in such a drawn sleeve, meanwhile assuming that the necessary sleeve thickness can be provided by a drawing operation to permit the formation of threads therein.

Finally, it does not appear possible to provide the number of full threads in a drawn sleeve required for many product applications and particularly when the stamped and drawn metal part is formed from heavy gauge metal.

In instances where self-tapping screws have been driven into such drawn sleeves, required strength of the threaded connection could not be obtained, either because of an insufficient number of engaged threads or an insufficient length of sleeve, or because of non-uniform sleeve thickness, or because of cracking of the drawn sleeve wall.

I have discovered and have made extruded plate metal sleeve structures and threaded plate metal sleeve structures which solve these long-standing and unsolved problems in the art. These new structures or products involve the fundamental concept of an extruded tubular neck or sleeve extending integrally from a plate metal wall having the desired or required sleeve length and thickness with concentric inner and outer sleeve surfaces, composed of metal which has been cold worked by metal displacement under pressure to substantially harden and strengthen the metal at least at and adjacent the inner and outer surfaces of the tubular sleeve, and having a predetermined cold formed length where desired, and being free of cracks or the tendency to crack.

The new structures or products of the invention also involve the fundamental concept of an extruded tubular neck or sleeve extending integrally from a wall of plate metal having an internally threaded sleeve surface formed by threads roll-tapped therein without metal loss, the metal in which the threads are formed being cold worked by the roll-tapping operation to harden and strengthen the metal in and adjacent the thread formations; and the threaded sleeve being further characterized by having a thread profile exhibiting 30% additional strenght as compared with similar threads cut in comparable metal material.

The new threaded structure or product of the present construction has a self-locking characteristic after being subjected to a predetermined amount of torque-tension loading in establishing a threaded connection between the threaded sleeve and a member threaded into the sleeve.

Similarly, the new threaded structures or products of the invention having cold worked, hardened and strengthened metal in the surfaces of the sleeve and the thread roll-tapped therein can withstand torque-tension loading substantially greater than prior types of threaded fasteners, of the order of 100 or more as compared with 65 to 70. Failure of threaded connections involving the new integral extruded threaded sleeve structure loaded to destruction invariably involves a stripping of the bolt threads rather than failure of the sleeve threads.

Another characteristic of the extruded threaded steel structures of the present invention is that the cold worked roll-tapped threads in the extruded sleeve may have in excess of 75% of full thread profile formed consistently from piece to piece in products manufactured in accordance with production procedures.

The new structures and products of the present invention also involve among other fundamental concepts, the concept of a new composite metal-rubber product having a metal component formed with an integral extruded sleeve exhibiting the new characteristics and combination of characteristics described; and the concept of a composite metal-rubber product having a metal component including an integral threaded fastener exhibting the new properties and characteristics described.

Accordingly, it is a general object of the present invention to provide new sheet or plate metal products having integral cold worked sleeves extruded therefrom.

Also, it is an object of the present invention to provide a new cold worked plate metal threaded fastener product having a sleeve extruded integrally from plate metal formed internally without metal loss with threads having cold worked hardened surfaces.

In addition, it is an object of the present invention to provide new composite metal-rubber products having at least one metal component formed with an integral threaded fastener having the new properties, characteristics and advantages and the rare combination of new properties, characteristics and advantages described.

Furthermore, it is an object of the present invention to provide new sheet or plate metal products having integral precision-formed threaded fastener sleeves.

In addition, it is an object of the present invention to provide new cold precision-formed threaded sleeve products projecting integrally from heavy gauge plate metal members.

Also, it is an object of the present invention to provide new cold worked extruded sleeve plate metal products having precision-formed inner and outer sleeve diameters concentrically arranged and which may be threaded internally or externally with a substantial number of complete threads.

Moreover, it is an object of the present invention to provide new cold worked plate metal products having integral extruded crack-free sleeves with internal lengths in excess of twice the plate metal thickness and with uniform sleeve wall thickness approximating one-half the plate metal thickness.

Also, it is an object of the present invention to provide new cold worked extruded sleeve plate metal products having the described structural and dimensional characteristics and consisting of metal precision-formed to sleeve shape by pressure displacement with uncut hardened external and internal metal surfaces.

In addition, it is an object of the present invention to provide new cold precision-formed products with threaded sleeves projecting integrally from plate metal which have self-locking characteristics with respect to threaded members engaged with the sleeve threads under torque-tension loading; and which are characterized by the property of springing back from distorted self-locking shape to initial shape when torque-tension loading is removed.

Furthermore, it is an object of the present invention to provide new plate metal products having integral threaded sleeves formed with thread profiles true as to size and undistorted as to shape; formed with thread profiles in excess of 75% of full thread profile; formed with thread profile having uncut, cold worked, roll-formed, hardened thread surfaces; and formed with thread profiles developing 30% additional strength as compared with similar threads cut in comparable metal material.

Also, it is an object of the present invention to provide new plate metal extruded sleeve products having a new combination of properties in respect of sleeve thickness, sleeve length, sleeve structure, sleeve metal surface characteristics, mechanical properties of sleeve metal, and metal hardness at and adjacent the sleeve surfaces.

Likewise, it is an object of the present invention to provide a new plate metal threaded fastener structure having a new combination of physical, dimensional, and surface characteristics and mechanical properties for the threaded structure.

Moreover, it is an object of the present invention to provide new composite molded metal-rubber products having metal components exhibiting the described characteristics, properties, and combinations of characteristics and properties, with such components having integral threaded fastener structures formed with clean, undistorted, properly-sized, self-locking threads.

Finally, it is an object of the present invention to provide the new products described which eliminate difficulties heretofore encountered in the art, which avoid problems, reduce costs, and provide structures having the enhanced characteristics and combinations of characteristics and properties described, and which achieve the stated objects in a simple, effective, and inexpensive manner and satisfy needs existing in the art.

These and other objects and advantages apparent to those skilled in the art from the following description and claims may be obtained, the stated results achieved, and the described difficulties overcome, by the products, structures, devices, elements, arrangements and parts which comprise the present invention, the nature of which are set forth in the following general statements, preferred embodiments of which—illustrative of the best modes in which applicant has contemplated applying the principles—are set forth in the following description and shown in the drawings and which are particularly and distinctly pointed out and set forth in the appended claims forming part hereof.

The nature of one aspect of the product discoveries of the present invention may be stated in general terms as preferably including in extruded plate metal sleeve structures, a plate metal, preferably steel, wall having a tubular sleeve cold extruded under pressure from the plate metal projecting integrally from one surface of the wall; the sleeve being crack-free and having an internal length in excess of twice the plate metal thickness; the sleeve having concentric inner and outer surfaces thereby providing uniform sleeve wall thickness; the sleeve wall thickness approximating one-half the plate metal thickness; the sleeve wall metal having a grain structure characteristic of metal cold extrusion displaced under pressure; the inner and outer pressure-formed sleeve metal surfaces being uncut; and the metal at and adjacent the sleeve surfaces having increased hardness and corresponding increased strength developed by the cold pressure extrusion displacement formation of the sleeve.

The nature of another aspect of the product discoveries of the present invention may be stated in general terms as preferably including in threaded plate metal sleeve structures, a plate metal, preferably steel, wall having a tubular sleeve cold extruded under pressure from the plate metal projecting integrally from one surface of the wall; the sleeve having a threaded inner surface; the thread profile of the threaded surface being true as to size and undistorted as to shape; the thread profile being in excess of 75% of full thread profile; the thread profile having uncut, cold worked, roll-formed, work-hardened metal thread surfaces; the uncut, roll-formed, work-hardened threads having strength for resisting yielding without a permanent set when subjected to torque-tension loading at least 30% in excess of the strength characterizing similar threads cut in comparable metal; the threaded sleeve having self-locking characteristics with respect to a threaded member engaged with the sleeve threads under torque-tension loading; and the threaded sleeve further being characterized by the property of springing back from distorted self-locking shape to initial shape when torque-tension loading is removed.

The nature of still another aspect of the product discoveries of the present invention may be stated in general terms as preferably including in composite molded metal-rubber products, the combination of a metal component having an integral extruded threaded plate metal sleeve structure exhibiting the characteristics, properties and combinations of characteristics and properties described; and the metal component integral threaded sleeve structure having clean, undistorted, properly sized, self-locking threads.

By way of example, the improved products as well as procedures for the manufacture of the improved products are shown somewhat diagrammatically in the accompanying drawings forming part hereof in which.

Figure 25:
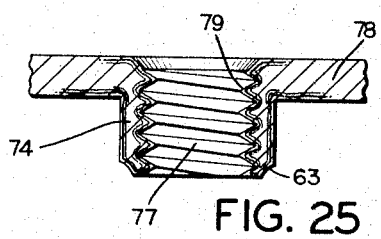
Figure 23:
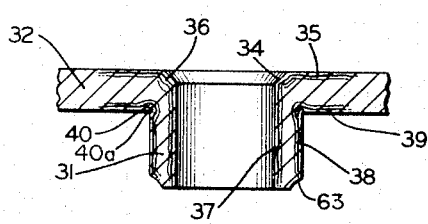
Figure 24:
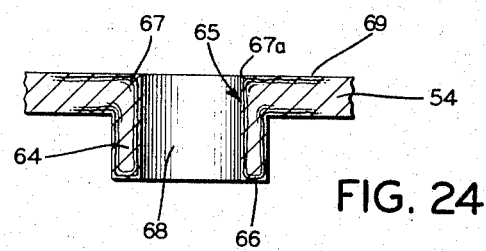
Figure 6:
Figure 10:
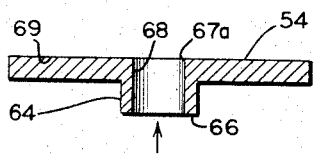
Figure 11:
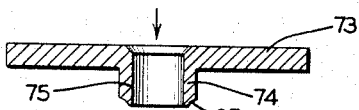
Figure 12:
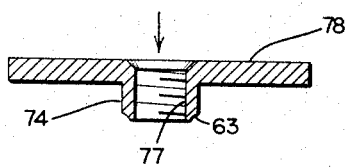
Figure 18:
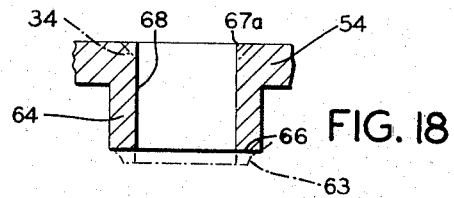
Figure 19:
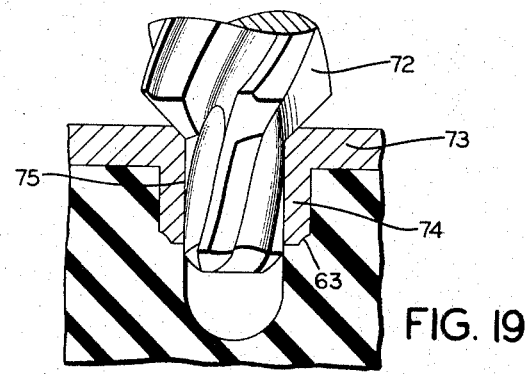
Figure 20:
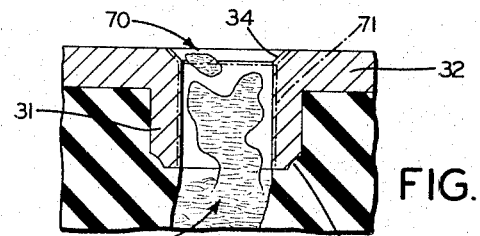
Figure 21:
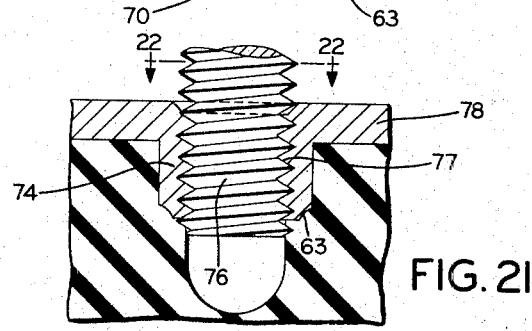
Figure 22:
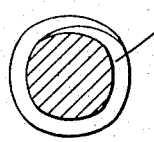
Figure 17:
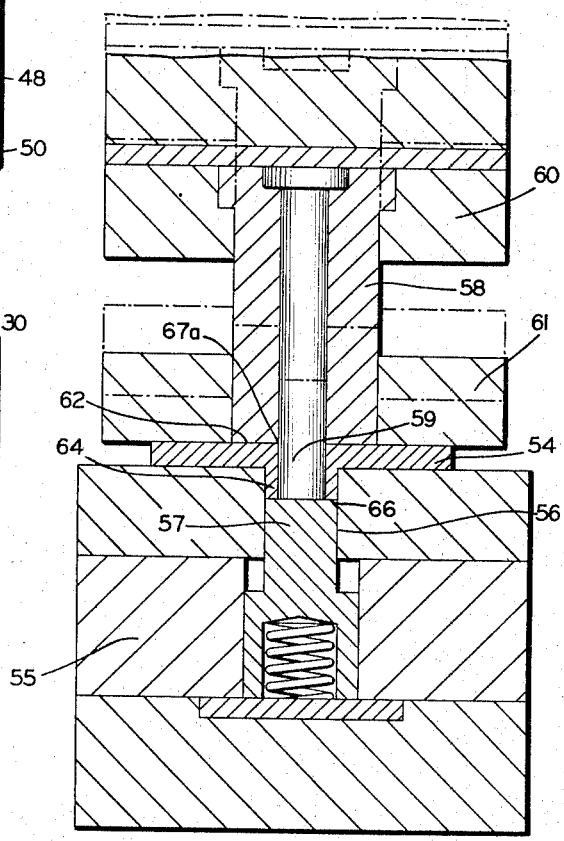

FIGS. 6, 7, 8, and 9 illustrate somewhat diagrammatically certain steps carried out in forming the improved extruded sleeve products of the invention;

FIG. 10 is a diagrammatic view illustrating a further step of accurately sizing the sleeve length in the manufacture of the improved product;

FIGS. 11 and 12 indicate somewhat diagrammatically further steps in the manufacture of the improved threaded sleeve products of the invention from extruded sleeves;

FIGS. 13, 14, 15, and 16 illustrate preferred die and control means used for a forward extrusion operation carried out in cold forming the improved extruded sleeve structure, the die means illustrated being shown at various stages of the forward extrusion operation;

FIG. 17 illustrates somewhat diagrammatically die means which may be used in carrying out a sleeve length sizing operation;

FIG. 18 is an enlarged view illustrating the structural change and metal flow produced by the sleeve length sizing operation of FIG. 17;

FIG. 19 is an enlarged view illustrating a drilling step used to clean the interior of a cold formed sleeve after rubber molding and prior to thread rolling;

FIG. 20 is a view similar to FIG. 19 illustrating the extent to which the tubular sleeve is drilled and cleaned by the operation shown in FIG. 19;

FIG. 21 is a diagrammatic view illustrating a roll-tapping step for forming the threads in the improved threaded product;

FIG. 22 is a section looking in the direction of the arrows 22—22, FIG. 21;

FIG. 23 is a fragmentary diagrammatic view illustrating the hardened cold worked surfaces of the improved integral cold precision-formed sleeve product;

FIG. 24 is a view similar to FIG. 23 of an improved cold precision-formed sleeve product which has been subjected to a sleeve length sizing operation; and FIG. 25 is a view similar to FIGS. 23 and 24 illustrating the hardened thread surfaces of the improved threaded sleeve structure.

Similar numerals refer to similar parts throughout the various figures of the drawings.

Extruded and threaded plate metal sleeve products and composite molded metal-rubber products of the present invention are shown in FIGS. 1, 2, 3, 4, 5, 23, 24, and 25. The composite product generally indicated at 1 in FIGS. 1 and 2 includes a metal component 2 containing an improved integral threaded sleeve fastener 3. Metal component 2 is bonded by molding with rubber 4 to an angular flanges U-shaped metal component 5, thus forming composite molded product 1.

Usual rubber molding procedures are used to form the composite metal-rubber product 1. In the FIGS. 1 and 2 arrangement, threaded fastener sleeve 3 projects inwardly into the rubber, as shown, from the inner surface 6 of metal component 2.

Figure 3:
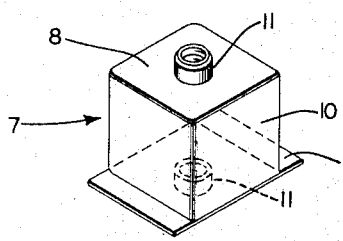
FIG. 3 is a perspective view somewhat diagrammatically illustrating a composite molded metal-rubber mounting pad incorporating the improved integral threaded fasteners.

Another composite product 7 is illustrated in FIG. 3 formed of an upper metal component 8, a lower metal component 9 and an intervening rubber block 10 molded thereto. Each of members 8 and 9 is formed from extremely light gauge sheet metal, and each also is formed with an integral tubular internally threaded sleeve 11 projecting outwardly of the component. The threaded sleeves 11 incorporate the new concepts of the invention.

Figure 4:
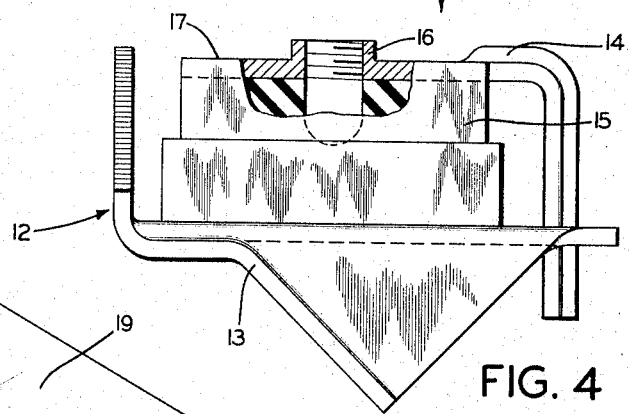
FIG. 4 is a side elevation, with parts broken away and in section, of a composite molded metal-rubber product provided with a metal component having another form of improved integral threaded fastener.

Another type of composite product is generally indicated at 12 in FIG. 4 and includes metal components 13 and 14 bonded together by rubber 15. The metal component 14 has an integral threaded sleeve 16 incorporating the improvements of the invention. Sleeve 16 is sized to exact length and projects outwardly from the outer surface 17 of component 14 and away from the rubber 15.

Figure 5:
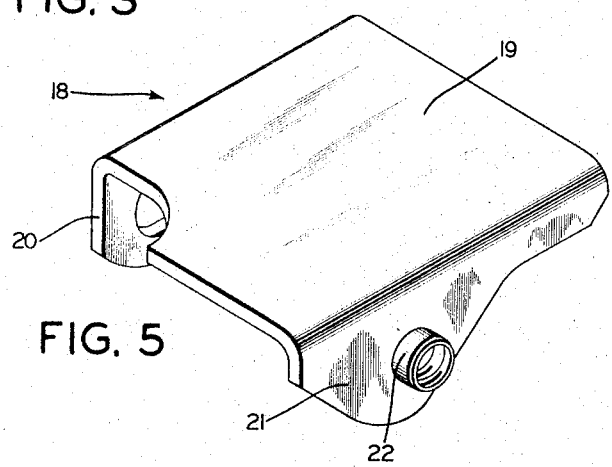
FIG. 5 is a perspective view of another stamped sheet metal product incorporating the improved integral threaded sleeve fastener construction of the invention.

Another type of improved stamped threaded fastener structure is indicated generally at 18 in FIG. 5 comprising a plate metal body 19 having flanges 20 and 21. A sleeve 22 is formed in and projects laterally from flange 21 and is internally threaded incorporating the improvements of the present invention.

The threaded fastener sleeve 3, 11, 16, and 22 each projecting integrally from a sheet or plate metal body portion in accordance with the invention may be made in the manner illustrated in FIGS. 6 to 12 and 18 to 22 and also as fully set forth in my co-pending application S.N. 411,753.

Various stages in the manufacture of an extruded plate metal sleeve structure are shown in FIGS. 6 through 10. A plate metal blank in which an extruded sleeve is to be formed is indicated at 23 in FIG. 6 and may have the required size or thickness for forming a finished stamped plate metal part or component. For example, 8-gauge sheet or plate metal (0.1719" thick) may be used to form the component 2 in the device shown in FIG. 1. On the other hand, the sheet metal from which the components 8 and 9 in FIG. 3 are formed may be 0.032" thick sheet metal.

Figure 7:
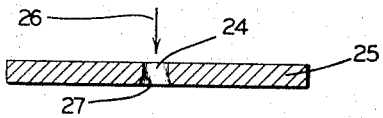
Figure 8:
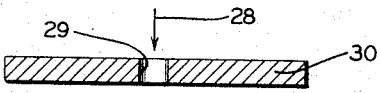

Plate blank 23 is pierced as indicated at 24 in FIG. 7 to provide the pierced blank 25. A usual piercing punch is diagrammatically designated by the arrow 26.

Pierced blank 25 has typical metal breakout 27 at the bottom of pierced hole 24. Successful extrusion from relatively thick plate metal blanks of a sleeve of any substantial length requires the metal breakout 27 to be removed and a hole having uniform diameter throughout to be established. This metal breakout removal may be accomplished by a shaving operation indicated in FIG. 8 wherein the pierced hole 24 is shaved by a punch indicated diagrammatically by the arrow 28 to produce a hole 29 of uniform diameter or truly cylindrical in the shaved blank 30.

Figure 9:
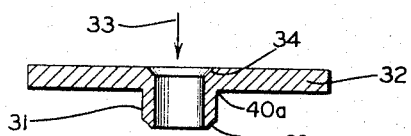

Next, a sleeve 31 is extruded from the blank metal of shaved blank 30 to produce the sleeve structure 32 illustrated in FIG. 9. The extrusion punch is illustrated diagrammatically by the arrow 33 in FIG. 9. The extrusion die and control means also are somewhat diagrammatically illustrated in FIGS. 13 through 16 to be later described.

Cold extrusion of sleeve 31 from metal in that portion of the blank 30 which surrounds shaved hole 29 occurs while the blank metal displaced and extruded is confined under pressure, and the final coining of the chamfered corner 34 at the blank metal wall end of sleeve 31 produces a typical cold-worked grain structure in the displaced metal sleeve wall wherein the metal at and adjacent the cold-worked surfaces is hardened. Such hardened metal is indicated by the shading in FIG. 23 at 35 at the top of sleeve structure blank wall 32, at 36 along the chamfered corner, at 37 along the internal surface of sleeve 31, at 38 along the external surface of sleeve 31, at 39 on the undersurface of blank metal 32, and at 40 around the square or sharp corner 40a shown (FIGS. 2, 3, 9, 11, 12, 15, 16, 19, 20 and 21) between the outer surface of sleeve 31 and the undersurface of blank wall 32.

Sleeve 31 (FIGS. 9 and 23) when formed in the die means of FIGS. 13 through 16 has uniform inner and outer diameters and true concentricity between the inner and outer sleeve surfaces is established and the square or sharp corner 40a is formed. The extruded integral sleeve 31 as shown, when extruded in the manner described may have an internal length more than twice the thickness of the plate metal blank 23. The uniform wall thickness of sleeve 31 may approximate one-half the thickness of plate metal 23. Also, where sleeve 31 is cold extruded in the manner described, it is free of cracks or cracking tendency which usually occur when a sleeve structure of the length and thickness indicated is attempted to be drawn from sheet or plate metal. Furthermore, the pressure displacement of metal during the extrusion operation in forming sleeve 31 produces a precision-formed sleeve shape with uncut hardened external and internal metal surfaces.

As indicated, the cold extrusion of sleeve 31 may be carried out in extrusion die means diagrammatically illustrated in FIGS. 13 through 16. The position of the parts when the die means is open is illustrated in dot-dash lines, and the position of the parts at the start of the extrusion operation is shown in full lines in FIG. 13.

Shaved blank 30 is placed on a die shoe 41 and clamped by stripper plate 42. Punch 43 carried by punch holder 44 has a coining shoulder 45, a punch nose 46 and a pilot portion 47. The undersurface of blank 30 is also supported by a tubular die support sleeve 48 formed with a central tubular opening 49 having the same diameter as the diameter of shaved hole 29 in blank 30. Die support sleeve 48 is carried by the upper end of a piston 50 controlled hydraulically and movable in cylinder 51 in the lower portion of die shoe 41. The top of support sleeve 48 is flush with the top of die shoe 41 in FIG. 13 when initially supporting the blank 30 as shown.

Figure 13:
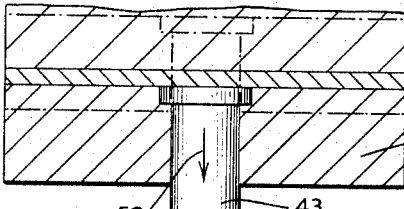
Figure 13:
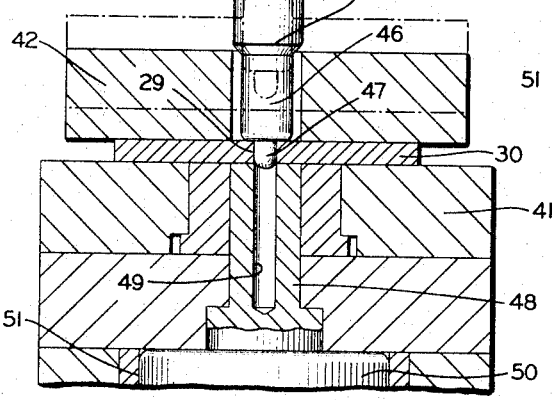

During initial downward movement of punch 43 indicated by arrow 52, pilot portion 47 enters and is piloted in shaved hole 29 and the lower end of punch nose 46 engages the upper surface of blank 30 surrounding shaved hole 29, as shown in FIG. 13. Meanwhile, the metal in blank 30 surrounding shaved hole 29 is supported and held by the upper end of die support sleeve 48.

Figure 14:
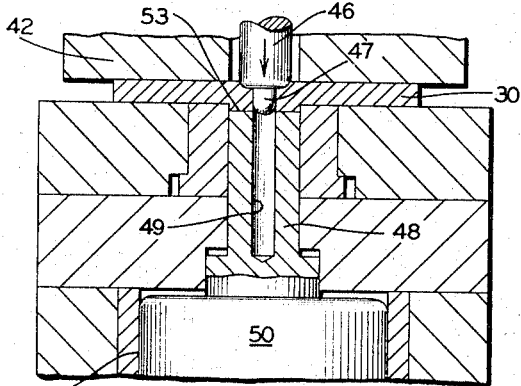

Continued downward movement of punch nose 46 as indicated in FIG. 14 starts a cold-working displacement and extrusion of metal in blank 30 surrounding shaved hole 29 and punch pilot portion 47 as indicated at 53 in FIG. 14. Piston 50 meanwhile yields to permit pressure displacement of metal in zone 53. Piston 50 is maintained in the cooperative relationship indicated to provide for forward extrusion displacement of the blank metal under pressure by controlled hydraulic pressure, not shown, acting on piston 50 in the manner described in detail in said co-pending application S.N. 411,753.

Figure 15:
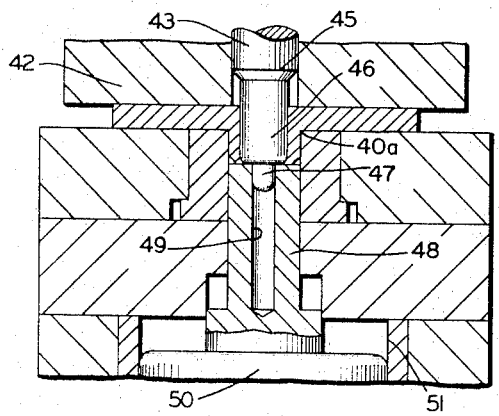

FIGURE 15 illustrates a further stage of the extrusion operation wherein punch 43 has continued downward movement and the lower end of nose 46 has just engaged the upper end of support sleeve 48.

During downward movement of support sleeve 48 in the opening in die shoe 41 (FIGS. 14, 15 and 16) from the position with its top flush with the top of die shoe 41 (FIG. 13) and as the sleeve 31 is cold extruded (FIGS. 14 and 15), a square or sharp corner 40a (FIGS. 9 and 23) is formed as shown between the outer surface of sleeve 31 and the undersurface of blank wall 32.

Figure 16:
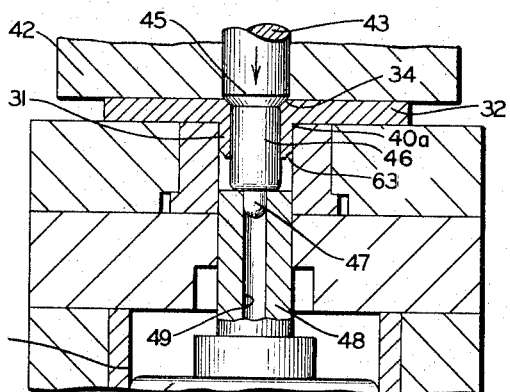

FIGURE 16 illustrates the final stage of the extrusion operation wherein punch nose 46 has completely penetrated the blank and extends entirely through sleeve 31 which has been extruded. Coining shoulder 45 during the final portion of punch movement engages the blank at the intersection of the top blank surface and the inner diameter of sleeve 31 and forms and coins chamfered corner 34 under pressure; and meanwhile metal in sleeve 31 is further slightly downwardly displaced or extruded during the coining stage of punch movement.

The coining of the chamfered frusto-conical-shape corner 34 by the coining shoulder 45 of punch 43 in addition to coining the shoulder and displacing metal forwardly or downwardly in sleeve 31 also imparts a permanent set to the cold-worked sleeve metal. This permanent set retains the extruded sleeve in the exact form and shape provided by the die parts upon removal of the extruded blank 32 from the die. That is, the worked and displaced metal which has been set, does not spring or distort to another shape on removal from the punch and die.

Early attempts to form extruded sleeve 31 without concluding the forward extrusion step with a coining stage to coin and set the metal in the sleeves, resulted in a sleeve, which when removed from the extrusion die, sprung to a somewhat accordion-like or corrugated shape in which threads could not be provided satisfactorily.

The length of extruded sleeve 31 in successive blanks cold extruded in die means such as illustrated in FIGS. 13, 14, 15, and 16 may not be uniform or exactly the same. Where a uniform or exact sleeve length is required or desired, the forwardly extruded sleeve 31 is preferably rearwardly extruded by a sleeve-length-sizing operation to provide a sized blank 54 such as illustrated in FIGS. 10, 17, 18, and 24. The sleeve-length-sizing operation may be carried out in a die such as shown in FIG. 17 having a die shoe 55 provided with a cavity 56 closed by a movable spring-pressed die bottom member 57. The die means also includes punch 58 with a reduced nose 59 carried by punch holder 60 mounted on a punch press ram. Punch holder 60 also carries a spring-pressed stripper plate 61. After insertion of an extruded blank 32 between punch 58 and die shoe 55 when the die is open (open position being illustrated in dot-dash lines), downward movement of punch 58 enters reduced nose 59 into the opening through sleeve 31 and the lower end 62 of punch 58 presses the sleeve metal axially against die cavity bottom member 57 to develop the exact sleeve length desired. This operation is accompanied by some backward extrusion of the metal in the sleeve which (FIG. 18) eliminates chamfer 34 at the upper end and the outer chamfered corner 63 at the lower or open end of the extruded sleeve, to form a sleeve shape of predetermined length as indicated at 64 in FIGS. 10, 17, 18, and 24. However, the metal in the sleeve 64 after backward extrusion is in the "set" condition described and does not change shape when removed from the die.

The further cold-working of the metal in the sleeve by backward extrusion during the sleeve-length-sizing operation is carried out under pressure and the cold-worked grain structure in the displaced metal sleeve wall 31 as described in connection with FIG. 23 is retained, as indicated generally at 65 in FIG. 24 where the hardened metal areas at and adjacent the cold-worked surfaces are indicated by shading. Such hardened areas are extended by backward extrusion under pressure to the flat open end 66 of sleeve 64 and may increase slightly at 67 at the square corner 67a between the inner surface 68 of sleeve 64 and the upper surface 69 of backward extruded blank 54 where the coined shoulder metal is backwardly extruded in sizing the sleeve length accompanied by elimination of the shoulder 34 (FIG. 24).

Figure 1:
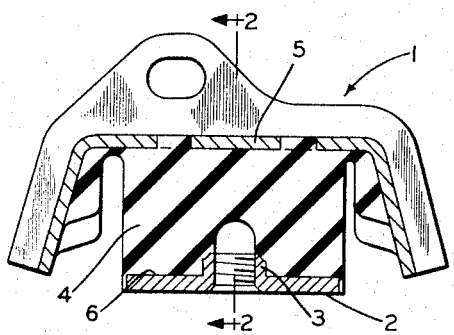
FIGURE 1 is a longitudinal sectional view of a composite molded metal-rubber product including a plate metal stamping component having an improved integral threaded fastener.
Figure 2:
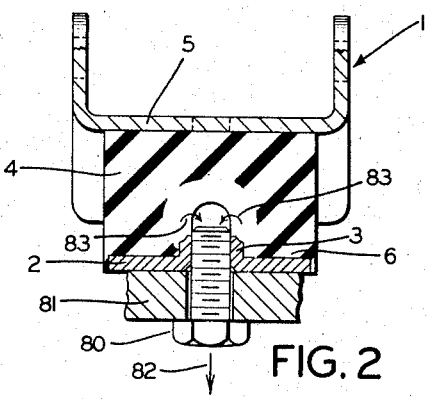
FIG. 2 is a section looking in the direction of the arrows 2—2, FIG. 1.

The extruded blank 32 or 54 when incorporated in a composite metal-rubber product then is molded with rubber and with one or more additional formed or stamped metal parts if desired, in a usual manner in accordance with rubber molding procedures to form a composite metal product such as illustrated in FIGS. 1 to 4. FIGS. 1 and 2 illustrate an extruded blank 32 molded with rubber to form the composite molded product 1; and FIG. 4 illustrates an extruded blank similar to sized blank 54 molded with rubber to form the composite molded product 12.

Invariably, despite all precautions that may be taken, the molded metal-rubber product (FIG. 20) has rubber or adhesive generally indicated at 70 adhering as a contaminating material to the inner surface of sleeve 31. This contaminating material 70 must be removed before the interior of sleeve 31 can be satisfactorily threaded since such contaminating material is very abrasive and destructive of any type of thread-forming tool that may be used.

Furthermore, in accordance with the invention, where a threaded fastener sleeve product is involved, it appears necessary at least from a practical standpoint to remove a thin skin of work-hardened metal from the inner work-hardened metal sleeve surface as indicated between the full and dot-dash lines at 71 in FIG. 20. This contaminating material removal and work-hardened metal removal may be accomplished by a drilling operation illustrated in FIG. 19, performed preferably by a sub-land drill 72 having drilling flutes arranged to cut and drill the cylindrical and chamfered hole surfaces. A drilled blank 73 with a drilled sleeve 74 is illustrated in FIG. 19 as well as in FIG. 11 where the rubber is omitted.

The drilling step serves a variety of purposes. First of all, it removes burrs or score marks from the interior of sleeve 31 which may have resulted from a cold extrusion operation when a punch has become worn. Second, contaminating rubber or rubber adhesive material used to bond the rubber to the metal in the rubber molding step such as indicated at 70 is removed. This contaminating material is very abrasive and can be damaging in carrying out a subsequent roll-tapping operation.

Third, the drilling step produces a close tolerance sleeve hole size for the hole 75 in drilled sleeve 74 which enables an increased height of thread profile to be provided in the subsequent roll-tapping operation.

Finally, the drilling operation in removing a thin skin of work-hardened metal indicated at 71 from the interior of the sleeve not only relieves stresses resulting from the cold extrusion of the sleeve but exposes for further processing clean stress-relieved metal with no work-hardened hindrance to a subsequent roll-tapping operation.

The next operation in the production of an integral threaded fastener particularly a fastener formed in a metal component of a composite metal-rubber product, is to form threads internally of an extruded sleeve such as sleeve 74 of drilled blank 73 or sleeve 64 of sleeve-length-sized blank 54. The clean and properly sized drilled hole 75 has a diameter, in accordance with the present invention, corresponding substantially to the pitch diameter of the threads to be formed therein.

The threads are formed by a roll-tapping operation carried out with a fluteless roll thread tap indicated at 76 in FIGS. 21 and 22. The fluteless roll-tap 76 may be a tap such as illustrated in Wells Reissue Pat. No. 24,572. The formation of threads by a roll-tapping operation is important since the roll-tapping operation forms the desired threads 77 in sleeve 74 without metal loss by cold working the metal in the interior of the sleeve and by displacing the cold-worked metal to establish the thread profile.

The roll-tapping operation can be carried out successfully to thread an extruded sleeve without cracking or weakening the sleeve and without any metal loss. Heretofore, attempts to thread a sleeve drawn from sheet metal either by roll-tapping or by cutting threads, resulted in sleeve failure either by cracking or by thinning as a result of metal cut away to form the threads.

As indicated, threading of an extruded sleeve by a roll-tapping operation is carried out as a last step in the procedure after the composite metal-rubber product is molded. In this manner the formed threads are clean and the formation of the threads by cold-working and metal displacement is not obstructed by rubber or other contaminating material which has been eliminated by the previous drill-cleaning operation.

It appears that the roll-tapping operation cannot be practically and properly carried out at least under high production procedures unless a thin skin 71 of work-hardened material at the inner surface of the extruded sleeve is removed prior to roll-tapping. The full explanation of this situation has not been determined. It is known to be vital to eliminate all foreign matter from the interior surface of the extruded sleeve, such as removal of rubber and adhesive material, before roll-tapping. Such foreign matter if not removed has an abrasive action preventing the proper formation of threads by a roll-tapping operation.

It also appears that the metal at the inner surface of the extruded sleeve work-hardened during cold-extrusion (as indicated at 37 in FIG. 23 and at 65 in FIG. 24) is hardened to such an extent that it hinders a roll-tapping operation from being carried out properly. The removal of the thin skin of work-hardened metal 71 (FIG. 20) by the drilling operation appears not only to expose a clean metal surface containing metal more readily formed and displaced by a roll-tapping operation, but also to expose softer metal backed up by hardened metal at the outer diameter of sleeve 74, which softer metal may be formed satisfactorily by a roll-tapping operation to provide a rather complete desired thread profile.

The roll-tapping of threads 77 in the threaded sleeve 74 of blank 73 produces a threaded fastener product 78 (FIGS. 12, 21, and 25). The metal in the sleeve 74 at and adjacent the surfaces of the threads 77 is work-hardened as a result of the roll-tapping operation (as indicated by the shading 79 in FIG. 25). Thus, the thin skin 71 of work-hardened metal (FIG. 20) removed by the drilling operation is reinstated by the work-hardened metal 79 at the surfaces of threads 77 (FIG. 25).

In the actual manufacture of the improved products of the invention, 7/16" threads—14 threads per inch, for example, have been roll-tapped satisfactorily and successfully by production procedures in a sleeve 0.430" long extruded in 8-gauge sheet or plate steel. Such a sleeve 74 with threads 77 may have had an outside extruded diameter of from 0.529" to 0.539". Its length (not backward extruded for sleeve-length-sizing) may range from 0.410" to 0.450" so that more than 5 full threads are formed. In carrying out the drilling step a skin of work-hardened metal from 0.0025" to 0.0075" thick is removed from the inner diameter 75 of sleeve 74. The shaving operation of FIG. 8 removes an average maximum thickness of shaved material of about 0.005" thick for a pierced hole adapted for forming an extruded sleeve having the dimensions indicated and roll-tapped to provide the threads described.

Obviously, the length and thickness of the extruded sleeve are dependent somewhat upon the thickness of the plate metal from which the sleeve is extruded and the outer diameter of the extruded sleeve. Normally, the initial pierced opening 24 will have a diameter approaching but preferably not in excess of the plate thickness. However, where increased sleeve thickness or length or both are desired, additional blank metal for the sleeve may be made available by reducing the size of the initially pierced opening to have a diameter substantially smaller than plate thickness.

Each of the products 1, 7, 12, and 18 may replace a similar product having a threaded fastener provided by a nut welded to the sheet metal component, with the savings at least of a minimum additional cost for any fastener determined by the unit cost of the nut. In accordance with the invention, no additional or new metal is required, the metal for forming the threaded fastener being extruded from the blank in which the fastener is provided. The only additional cost in forming the threaded fastener in accordance with the invention is the initial cost of the dies used to carry out the successive operations; and these preferably are incorporated in and as a part of other die operations required for forming the metal stampings produced.

The new extruded plate metal product, the new extruded threaded plate metal product, and the new composite metal-rubber product having a metal component formed with an integral threaded fastener have a number of new properties, characteristics, and advantages and contain a rare combination of new properties, characteristics, or advantages never before known in the art.

Thus, the strength of the threaded fastener produced equals or exceeds that obtained in other known fasteners formed with comparable threads and from comparable material. The threaded profile provided by roll-tapped threads formed in an extruded sleeve has 30% additional strength as compared with similar threads cut in comparable metal material.

When a bolt or other threaded member is engaged with the threaded sleeve 3, for example a bolt 80, FIG. 2, securing the product 1 to a member 81 with a predetermined amount of torque-tension loading, the threaded sleeve 3 is self-locking at the threaded connection with respect to the bolt. That is to say, tension on the bolt acting in the direction of the arrow 82 tends to pull the threaded sleeve 3 at its open or free end, inward and into the sleeve opening, as indicated by arrows 83 in FIG. 2. Such self-locking is accompanied by some distortion of the sleeve. However, the self-locking feature may eliminate the necessity for lock-washers and the like for the bolted connection.

Another characteristic of the threaded fastener is that after a bolted connection has been made which is self-locking after establishing a predetermined torque-tension loading, upon release of bolt 80, the thread profile in sleeve 3 returns from distorted to original state or position.

That is to say, the threaded sleeve does not yield so that it takes a permanent set.

Because among other reasons of the additional strength of the thread profile of roll-tapped threads in the extruded sleeve and of additional strength and hardness imparted to the sleeve and thread metal, resulting from the cold working to form the sleeve and threads, the new threaded fastener can withstand torque-tension loading substantially greater than prior types of threaded fasteners, of the order of 100 or more as compared with 65 to 70. Failure of threaded connections loaded to destruction invariably involves stripping of the bolt threads rather than failure of the sleeve threads.

The inner and outer diameters of the extruded sleeve can be maintained within very close tolerances and substantially absolute concentricity can be provided. This means that the resultant threaded fasteners will have more uniform strength and performance from piece to piece.

Since the free end of the extruded sleeve is free of cracks or fractures, the sleeve may be threaded without cracking or failure and the threads, though normally provided internally of the extruded sleeve can be formed externally, if desired.

The thread profile of threads formed in accordance with the invention in the extruded sleeve can be maintained in excess of 75% of full thread profile.

The rearward extrusion of metal in forwardly extruded sleeve 31 to produce sleeve 64 (FIGS. 9 and 10) by an operation shown in FIG. 17 in addition to establishing an exact length for sleeve 64 and to providing metal in "set" condition, also strengthens the entire sleeve from the cold-working pressure to which the metal in the entire sleeve is subjected. Consider first, the coining of metal by punch shoulder 45 at chamfer 34 at the conclusion of the forward cold extrusion operation (FIG. 16). This increases the sleeve length somewhat and sets the metal so that there is no spring-back distortion when the extruded part is removed from the dies. Equally important is the increased strength or hardness imparted to the metal by the coining pressure in the metal zone at and adjacent chamfer 34. Such increased strength may be greater in this zone than in other portions of the extruded sleeve 31.

Now, when sleeve 31 is rearwardly extruded as in FIGS. 10 and 17 to size the sleeve length, the entire surface of sleeve 64 is subjected by the contacting punch and die surfaces to squeezing pressure which displaces or extrudes the sleeve metal rearwardly. This cold works the metal throughout the sleeve and hardens the metal particularly at all sleeve surfaces. Such cold working and hardening thus extend the increased strength of the sleeve metal in the zone of chamfer 34 of sleeve 31 throughout the entire rearwardly extruded sleeve 64.

A desired number of roll-tapped threads may be formed in the cold extruded products of the invention because the tubular sleeve cold extruded integrally from the plate metal blank may have uniform sleeve wall thickness approaching one-half the plate blank thickness and may have a length projecting from the plate metal in excess of the plate blank thickness. That is, in the example given, the projecting length of the sleeve may be from 0.238" to 0.278" which is considerably greater than the 0.1719" thickness of the 8-gauge material in which the sleeve is formed. The complete internal length of the sleeve is from 0.410" to 0.450" thereby providing a sufficient length in which from five to six threads may be formed of a thread profile for 14 threads per inch with 7/16" threads. The sleeve thickness in the example given is 0.072" which is nearly one-half the thickness of 8-gauge material.

Furthermore, the improved integral threaded sleeve may be formed in very thin sheet metal as illustrated in FIG. 3, such as in sheet metal 0.032" thick (22-gauge), wherein thread formations and thread profiles in the sleeve are provided which could not be formed in any other known manner in products made from such light gauge sheet metal.

Accordingly, the new extruded plate metal sleeve products, the new extruded threaded plate metal sleeve or fastener products, and the new composite metal-rubber products including a metal component formed with at least one integral threaded fastener have many new properties, characteristics and advantages and an unusual combination of new properties, characteristics and advantages including among others; an extruded tubular sleeve structure extending integrally from a plate metal wall having desired or required sleeve length and thickness with concentric inner and outer sleeve surfaces composed of metal which has been cold-worked by metal displacement under pressure to substantially harden and strengthen the metal at least at and adjacent the outer surfaces of the tubular sleeve, and having a predetermined cold-formed length where desired, and being free of cracks or the tendency to crack, all without sleeve length limitation because of the size of the sleeve opening or the thickness or thinness of the plate metal from which the sleeve integrally extends; also a tubular internally threaded sleeve structure in a sleeve extending integrally from a plate metal wall having threads roll-tapped therein without metal loss with the metal in which the threads are formed having a cold-worked grain structure hardened and strengthened by such cold working, having a true and undistorted thread profile exhibiting 30% additional strength as compared with similar threads cut in comparable metal material, having threaded zones which have self-locking characteristics upon being subjected to a predetermined amount of torque-tension loading involving sleeve and thread metal distortion without a resultant permanent set such that the metal springs back to undistorted position upon relieving the torque-tension loading, and having cold-worked roll-tapped uncut threads formed with a thread profile in excess of 75% of full thread profile; and composite metal-rubber products exhibiting in their new integral threaded fastener metal components the new characteristics described; and the new precision-formed products eliminating difficulties heretofore encountered in the art, avoiding problems and satisfying needs existing in the art, and achieving the stated objects in a simple, effective and inexpensive manner.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention and new products are by way of example, and the scope of the invention is not limited to the exact details, sizes, etc. described because various products incorporating the fundamental structures and concepts of the invention may be made without departing from the fundamental principles set forth.

Although the terms "sheet metal" and "plate metal" are used herein, when referring to light and heavy gauge material, since the invention is applicable to products manufactured from either sheet or plate metal, it is to be understood that the terms "sheet metal" and "plate metal" are used more or less synonymously.

Having now described the features, discoveries and principles of the invention, the characteristics of the new products, the manner in which the products may be made, and the advantageous, new and useful results obtained thereby; the new and useful products, structures, devices, elements, arrangements and parts and the related discoveries and principles, and mechanical equivalents obvious to those skilled in the art are set forth in the appended claims.

Certain methods and procedures for making the improved products of the invention, disclosed but not claimed herein, are claimed in my co-pending application S.N. 411,753.

I claim:

1. In an extruded plate steel structure, a plate steel wall having top and bottom surfaces, a precision-formed sleeve having inner and outer concentric sleeve surfaces projecting integrally from the bottom plate surface; the sleeve being tubular in shape and having an open end and defining an internal opening extending from the top plate surface to said open sleeve end; there being an outer chamfered corner at the open end of the sleeve; the inner and outer sleeve surfaces each having a uniform diameter providing uniform sleeve wall thickness between the chamfered corner at the open sleeve end and the bottom plate surface; there being a square corner between the outer sleeve surface and the bottom plate surface; there being a coined-steel, chamfered, frusto-conical-shaped corner between the internal sleeve opening and the top plate surface; the sleeve being composed of crack-free steel cold extrusion displaced and worked under confined pressure from steel in said plate wall; the coined and cold confined-pressure-worked metal in the coined-steel corner and sleeve imparting a permanent set to the cold-worked metal in the sleeve stably to retain the sleeve in its exact precision-formed shape; and the cold-worked steel at and adjacent the top plate surface, the coined chamfered corner, the inner and outer concentric sleeve surfaces, the bottom plate surface and the corner between the outer sleeve surface and bottom plate surface exhibiting a work-hardened grain structure and being characterized by work hardness and corresponding strengthening developed by said cold extrusion displacement under confined pressure.

2. The structure set forth in claim 1 in which the metal in the zone at and adjacent the coined-steel, chamfered, frusto-conical-shaped corner has greater hardness and strength than the hardened and strengthened steel in the remainder of the sleeve.

3. The structure set forth in claim 1 in which the uniform sleeve wall thickness approximates one-half the plate wall thickness, and in which the sleeve has an internal length in excess of twice the plate wall thickness.

4. The structure set forth in claim 1 in which the plate steel wall is formed of 0.1719" thick plate steel, in which the sleeve is from 0.410" to 0.450" in internal length, in which the sleeve has 0.072" uniform thickness between inner and outer concentric surfaces, and in which the sleeve has an outer diameter of from 0.529" to 0.539".

5. The structure set forth in claim 4 in which the internal sleeve opening is threaded throughout its entire length between the open end and the chamfered, frusto-conical-shaped corner; in which the pitch diameter of the threads is concentric with the outer sleeve surface; and in which from 5 to 6 threads are formed in the internal sleeve opening having the thread profile of $7/16$"—14 threads per inch threads.

6. The structure set forth in claim 1 in which the internal sleeve opening is threaded throughout its entire length between the open end and the chamfered, frusto-conical-shaped corner; in which the pitch diameter of the threads is concentric with the outer sleeve surface; in which the threaded sleeve surface is composed of roll-formed steel cold displaced under pressure; in which the pressure displaced steel at and adjacent the threaded sleeve surface exhibits a cold-worked grain structure and is characterized by work hardness and corresponding strengthening developed by said roll-formed metal displacement; in which the hardened and strengthened metal in the threads is crack-free and has uncut surfaces; and in which the threaded sleeve is further characterized by having strength to resist torque-tension loading without permanent deformation 30% in excess of the strength of a threaded sleeve formed of the same steel to the same dimensions with cut threads.

7. The structure set forth in claim 6 in which the thread profile of the threaded inner sleeve surface is true as to size, undistorted as to shape, and contains in excess of 75% of full thread profile.

8. The structure set forth in claim 7 in which the cold pressure displaced steel exhibits a cold-worked grain structure characterized by work hardness in the threaded sleeve thread profile, after thread metal distortion from being subjected to torque-tension loading, causes the thread profile to spring back to undistorted position upon relieving the torque-tension loading; thereby providing self-locking characteristics to the threaded sleeve when subjected to a predetermined amount of torque-tension loading.

9. The extruded plate steel structure set forth in claim 1 bonded with rubber in spaced relation with another similarly bonded metal component to form a composite metal-rubber product.

10. The extruded plate steel structure set forth in claim 6 bonded with rubber in spaced relation with another similarly bonded metal component to form a composite metal-rubber product.

References Cited

UNITED STATES PATENTS

| | | | |
|---|---|---|---|
| 2,157,354 | 5/1939 | Sherman | 10—86 |
| 2,909,281 | 10/1959 | Koskinen | 72—256 |
| 680,991 | 8/1901 | Crosby | 85—32 |
| 2,026,859 | 1/1936 | Baynes | 85—32 |
| 2,126,706 | 8/1938 | Schmidt | 85—32 |
| 2,460,721 | 2/1949 | Thompson | 85—32 |
| 2,632,355 | 3/1953 | Becker | 85—32 |

FOREIGN PATENTS 467,199  8/1950  Canada.

CARL W. TOMLIN, *Primary Examiner.*

RAMON S. BRITTS, *Assistant Examiner.*